Aug. 6, 1968 P. E. CHECKLEY ET AL 3,395,650
TELESCOPIC HYDRAULIC DEVICES FOR CONTROLLING
THE SPEED OF RAILWAY VEHICLES
Filed Aug. 18, 1966

INVENTORS
PETER E. CHECKLEY
BY JOHN C. ESCOTT
COLIN R. LITTLE

Christensen, Sanborn + Matthews
ATTORNEY

United States Patent Office 3,395,650
Patented Aug. 6, 1968

3,395,650
TELESCOPIC HYDRAULIC DEVICES FOR CONTROLLING THE SPEED OF RAILWAY VEHICLES
Peter Edward Checkley, John Charles Escott, and Colin Robert Little, Cheltenham, England, assignors to Dowty Mining Equipment Limited, Ashchurch, Tewkesbury, Gloucester, England, a British company
Filed Aug. 18, 1966, Ser. No. 573,401
Claims priority, application Great Britain, Aug. 23, 1965, 36,080/65
3 Claims. (Cl. 104—162)

ABSTRACT OF THE DISCLOSURE

A track mounted cylinder and piston device for influencing the speed of free-running railway vehicles by the action of different fluid pressures during contraction and extension respectively of the device, comprises a cylinder member secured in an upright position against one side of a track rail by a bracket so that the piston member is spaced from the head of the rail, while a head on the piston member which extends toward the rail is engageable by the flange of a wheel rolling along the rail. The bracket is adjustable in height by a bolt and nut fastening in which the shank of the bolt has eccentric portions engaging fitting bores in the bracket and the central web of the rail respectively, the bolt having a key remote from the head of the bolt by which the bolt can be turned before the nut is tightened. The bracket has guide faces slidably engaged by guide members on the head of the piston member which prevent substantial turning of the piston member but which possess inherent resilience.

---

This invention relates to cylinder and piston devices for mounting adjacent a rail to influence the speed of free-running railway vehicles by the action of each device against the periphery of a vehicle wheel under one fluid pressure during contraction of the device and under a different fluid pressure during extension of the device. Such a device will be hereinafter referred to as a device of the kind specified.

Such devices are described in United States Patent No. 3,040,676 and each may comprise a cylinder member mounted against a track rail, and a piston member having a head which normally lies above the rail in a position to be engaged by a flange of a vehicle wheel so that it moves downwardly and then upwardly as the wheel rolls over the device, the device being arranged to retard fast moving vehicles by high fluid pressure resistance to contraction of the device and subsequent extension under low fluid pressure. Such a device may additionally be arranged to accelerate slow moving vehicles by contraction under low fluid pressure followed by extension under high fluid pressure.

In such known devices the cylinder is mounted so that the line of rolling contact of the wheel flange with the head of the piston member lies in a plane which contains or lies close to the longitudinal central axis of the telescopic device. When the wheel flange first engages the head, the piston member is accelerated to a speed dependent on wheel speed in a very short time interval. This engagement is in the nature of an impact which applies high stresses.

According to the present invention, in a device of the kind specified, the cylinder member is mounted in a generally upright position so that the piston member is substantially spaced from the head of the rail on which the vehicle wheel rolls, while the piston member has a head which is engageable by the flange of a vehicle wheel and which is laterally extended towards the rail head whereby it passes close to the rail head during contraction and extension of the telescopic device, the position of the cylinder member and the piston member with respect to the rail being such that the line of rolling contact of the wheel flange with the head of the piston member is substantially offset from the longitudinal central axis of the device towards the head of the rail, whereby the shock load due to impact of the wheel flange on the head of the piston member is reduced by elastic deformation of the device.

The cylinder member may be mounted by a bracket which is secured against the central web of the rail, and this mounting may be constructed to possess inherent resilience which contributes to reduction of the impact shock.

The increased resilience in the telescopic device and or its mounting enables the time interval during which the piston member is accelerated to be increased, thereby reducing impact forces.

Figure 2:
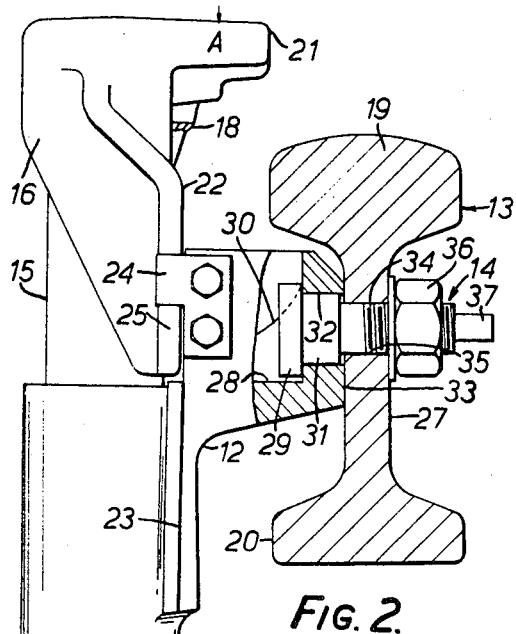
Figure 3:
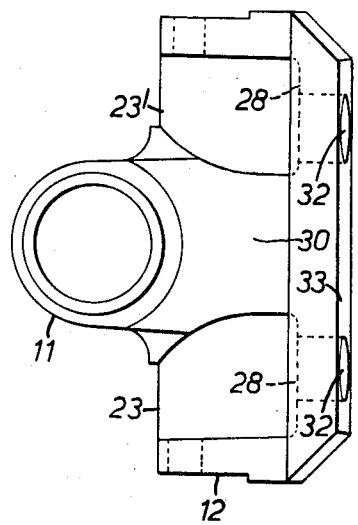
Figure 4:
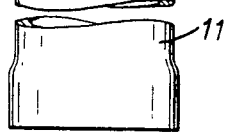
Figure 5:
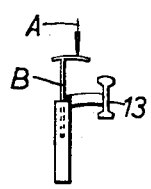
Figure 1:
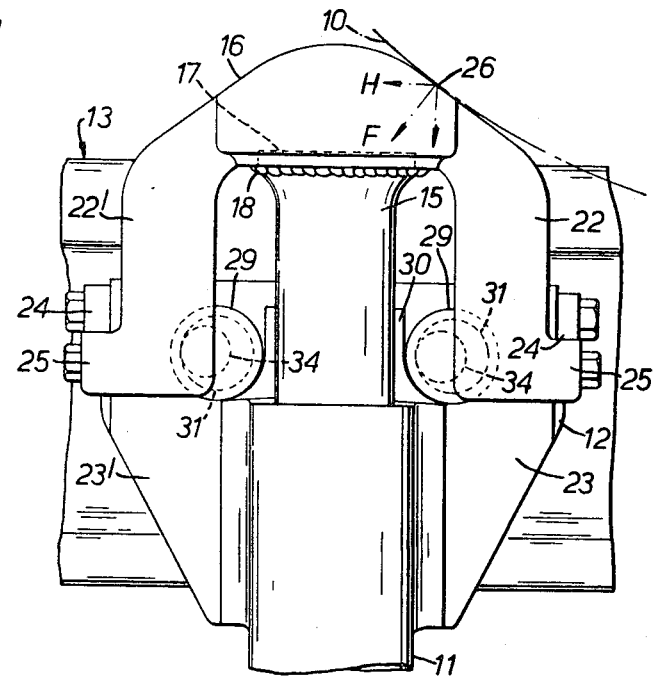

One embodiment of the invention is illustrated in the accompanying drawings, of which:

FIGURE 1 is a side elevation of the upper part of a hydraulic speed control device mounted against a rail, FIGURE 2 is an elevation end-on to the rail, showing one of the bolt fastenings partly in section, FIGURE 3 is a plan view of the cylinder member of the device, including the mounting bracket, FIGURE 4 is a diagram illustrating the arrangement according to prior devices, and FIGURE 5 is a diagram illustrating the arrangement according to the present invention.

The cylinder member 11 has a bracket member 12 united therewith, for example by an integral cast construction. Alternatively, the members may be formed separately and then united by welding. The bracket member is shaped for attachment to the rail 13 by two bolt fastenings 14 which will subsequently be described in detail.

The piston member 15 of the device projects upwardly from the cylinder member 11 and carries a head 16 which is engageable by the flange 10 of a wheel rolling along the rail 13. The head 16 may be formed separately from the piston member 15, and be secured thereto by a spigot and socket connection 17 and a welded joint 18. The bracket member 12 has a breadth in the lateral direction to locate the cylinder such that the piston member 15 is substantially spaced from the head portion 19 and the base portion 20 of the rail 13. The head 16 has a lateral enlargement 21 which extends towards the rail head 19 whereby this enlargement 21 passes close to the rail head 19 during contraction and extension of the telescopic device. During such movement, the piston member 15 and its head 16 are prevented from turning by a pair of depending ears 22, 22' which are integral with the head 16 and which slidably engage guide faces 23, 23' on the bracket 12, these guide faces being disposed in the longitudinal direction of the rail 13 on the opposite sides of the cylinder 11. The bracket 12 carries a pair of stops 24 which are engageable by lugs 25 on the respective ears 22, 22' to provide a limit to extension of the telescopic device.

In the devices in accordance with the prior specification in which the cylinder member is mounted close to the rail, the flange of a vehicle wheel has a line of rolling contact lying in a plane, shown by the arrow A in FIGURE 4, which contains or lies close to the longitudinal central axis B of the device. In the construction according to the present invention, FIGURE 5, the wheel flange is engageable with the head 16 or the enlargement 21 thereof along a line of rolling contact lying in a plane, shown by the arrow A, which is substantially offset from the longitudinal central axis B of the device towards the head 19 of the rail 13. The line of rolling contact may, for example, pass through or near to a position, shown by the arrow A in FIGURE 2, which lies wholly to one side of the cylinder member 11 and the piston member 15.

The point 26 of FIGURE 1, at which a wheel flange first engages the head 16 is therefore spaced from the central axis of the device both in a direction transverse to the rail and in the longitudinal direction of th rail. Both said spacings produce an increased moment arm about which the initial impact force F on the wheel flange applies a bending moment to the piston member 15. The impact shock of the wheel flange on the head 16 is therefore partially absorbed by elastic deformation of the telescopic device. The construction of the mounting bracket 12 with its bolt fastenings 14 may possess inherent resilience which contributes to reduction of the impact shock. Such inherent resilience will be greater in the device of FIGURE 5 because the transverse spacing provided by the bracket member 12 between the cylinder 11 and the rail 13 is greater than that provided by the prior device of FIGURE 4.

The horizontal component H of the initial impact, moreover, applies a turning force to the head 16 about the central longitudinal axis of the device, this force being resisted by engagement of the ear 22 with the face 23. This ear 22 will, by reason of its inherent resilience, permit a limited turning movement of the head 16 under the initial impact shock. When the head 16 has been depressed to the point where the head enlargement 21 is about to pass close to one side of the rail head 19, the length of the ear 22 above the guide face 23 will have been reduced to decrease the effective resilience of the ear 22, and therefore ensure correct orientation of the head enlargement 21 with respect to the rail head 19. The ear 22 may alternatively be provided with increased resilience by forming it as a leaf spring, or by a pile of two or more leaf springs, rigidly secured to the head 16.

The various factors affording resilience, may bring about a reduction of contact pressure between the wheel flange and the piston head 16 at the moment of impact.

The adjustable mounting of the bracket member 12 to the central web 27 of the rail 13 will now be described. The bracket 12 has two recesses 28 from the guide face 23 on opposite sides of a stiffening rib 30, receiving the head 29 of a fastening bolt 14. A concentric shank portion 31 of lesser diameter, below the head 29, fits a corresponding bore 32 in the bracket 12. This bore 32 opens at a face 33 on the bracket which mates with the face of the web 27. A still further reduced shank portion 34, FIGURE 1, which is eccentric with respect to the shank portion 31 fits a bore 35 in the rail web 27. This shank portion is screw-threaded over part of its length to receive a fastening nut 36, while an integral portion 37 projecting from the shank portion 34 is formed with a square section to form a turning key. Both bolt fastenings are similar.

In mounting the device, the position at which the holes 35 are to be drilled in the rail is determined in relation to the upper surface of the rail head 19 by a drilling jig. Both bolts 14 can subsequently be adjusted, using a pair of turning keys, to set the device with the piston head 16 at a pre-determined height above the upper surface of the rail head 19, after which the fastening nuts 36 are finally tightened.

The device may be installed on either new rails, or on old rails which have worn on their upper surfaces. The mounting bracket 12 has a vertical depth which is less than the distance between the top and bottom portions of the rail, so as to allow for extremes of position in which the bracket 12 may need to be secured having regard to the condition of the rail.

The device may be adapted for mounting against other rail sections which differ from that shown in FIGURE 2.

We claim as our invention:

1. A cylinder and piston device of the kind specified, wherein the cylinder member of the device is mounted in a generally upright position by a bracket which is secured by fastening means against the central web of the rail, so that the piston member of the device is spaced from the head of the rail, and wherein the piston member has a head which is engageable by the flange of a vehicle wheel rolling along the rail and which extends towards the rail so that it passes close to the rail during contraction and extension of the device, said fastening means including at least one fastening bolt having eccentric shank portions of which one portion engages a bore in the bracket and of which the other portion engages a bore in the central web of the rail, said other portion including a screw-threaded end projecting from the other side of the central web for engagement by a fastening nut, and a turning key provided on said projecting end by which the fastening bolt can be turned to adjust the height of the bracket on the rail before the fastening nut is tightened.

2. A cylinder and piston device according to claim 1 wherein the line of rolling contact between the wheel flange and the head of the piston member is relatively offset from the central longitudinal axis of the device, and the device is elastically deformable to accommodate the shock load due to impact of the flange on the piston member.

3. A cylinder and piston device of the kind specified, wherein the cylinder member of the device is mounted in a generally upright position by a bracket which is sesured by fastening means against the central web of the rail, so that the piston member of the device is spaced from the head of the rail, and wherein the piston member has a head which is engageable by the flange of a vehicle wheel rolling along the rail and which extends towards the rail so that it passes close to the rail during contraction and extension of the device, the cylinder member having generally upright guide faces and the head of the piston member having guide elements arranged for sliding engagement with said guide faces to prevent substantial turning of the piston member during contracttion and extension of the device, in which said guide elements are formed with inherent resilience so as to be resiliently yieldable under a turning moment applied to the piston by impact of a wheel flange against the head of the piston at a position thereon spaced from the central axis of the device.

References Cited
UNITED STATES PATENTS

| | | | |
|---|---|---|---|
| 3,107,633 | 10/1963 | Bick | 104—162 |
| 3,148,633 | 9/1964 | Bick et al. | 104—162 |

ARTHUR L. LA POINT, *Primary Examiner.*

D. F. WORTH, *Assistant Examiner.*